United States Patent
Chen et al.

(10) Patent No.: US 12,452,225 B2
(45) Date of Patent: Oct. 21, 2025

(54) METHOD, SERVER, AND COMPUTER PROGRAM PRODUCT FOR IDENTITY AUTHENTICATION

(71) Applicant: Dell Products L.P., Round Rock, TX (US)

(72) Inventors: Si Chen, Shanghai (CN); Zhenzhen Lin, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 18/317,291

(22) Filed: May 15, 2023

(65) Prior Publication Data

US 2024/0348589 A1    Oct. 17, 2024

(30) Foreign Application Priority Data

Apr. 14, 2023    (CN) .......................... 202310404965.6

(51) Int. Cl.
*H04L 9/40*    (2022.01)
(52) U.S. Cl.
CPC .............. *H04L 63/08* (2013.01); *H04L 63/20* (2013.01)
(58) Field of Classification Search
CPC .......... H04L 63/08; H04L 63/20; G06F 21/31
See application file for complete search history.

(56) References Cited

U.S. PATENT DOCUMENTS

| | | | |
|---|---|---|---|
| 11,870,818 B1 * | 1/2024 | Sutherland | H04L 63/102 |
| 2014/0331282 A1 * | 11/2014 | Tkachev | H04L 63/0884 726/3 |
| 2016/0359854 A1 * | 12/2016 | Bhargava | G06F 21/45 |
| 2022/0174585 A1 * | 6/2022 | Ge | H04L 61/4541 |
| 2023/0229787 A1 * | 7/2023 | Mahdavipour | H04L 63/1433 726/25 |
| 2024/0121081 A1 * | 4/2024 | Venkatesan | H04L 9/3218 |

OTHER PUBLICATIONS

S. Rose et al., "Zero Trust Architecture," https://doi.org/10.6028/NIST.SP.800-207, National Institute of Standards and Technology Special Publication 800-207, Aug. 2020, 59 pages.
Cybersecurity and Infrastructure Security Agency, "Zero Trust Maturity Model," Pre-decisional Draft, Version 1.0, Jun. 2021, 19 pages.

\* cited by examiner

*Primary Examiner* — Nicholas R Taylor
*Assistant Examiner* — Tania M Pena-Santana
(74) *Attorney, Agent, or Firm* — Ryan, Mason & Lewis, LLP

(57) ABSTRACT

The present disclosure relates to a method, a server, and a computer program product for identity authentication. The method includes searching, in response to receiving an identity authentication request from a user at an edge server, an identity authentication database of the edge server for identity authentication information associated with the user. The method further includes sending, in response to the identity authentication information associated with the user not being found in the identity authentication database, the identity authentication request to a cloud server, the cloud server including an agent for interfacing with a plurality of identity authentication providers. In addition, the method further includes receiving the identity authentication information associated with the user from the cloud server, storing the identity authentication information to the identity authentication database, and using the identity authentication information to authenticate the user.

20 Claims, 9 Drawing Sheets

METHOD, SERVER, AND COMPUTER PROGRAM PRODUCT FOR IDENTITY AUTHENTICATION

RELATED APPLICATION

The present application claims priority to Chinese Patent Application No. 202310404965.6, filed Apr. 14, 2023, and entitled "Method, Server, and Computer Program Product for Identity Authentication," which is incorporated by reference herein in its entirety.

FIELD

Embodiments of the present disclosure relate to the field of information security and, more specifically, to a method, a server, and a computer program product for identity authentication.

BACKGROUND

Identity and access management (IAM) is a process of creating, authenticating, authorizing, and managing user identities in computer networks and application systems. The main goal of IAM is to ensure users have access to corresponding resources and services, while protecting the systems from unauthorized access. IAM is important to both the industry and enterprises. As an entry point, IAM is a cornerstone for securing IT infrastructure. IAM protects systems from damage and attack by prohibiting illegal users from accessing restricted resources.

The emergence of zero-trust models has placed new requirements for IAM. The zero-trust model is a security framework that requires all users, whether inside or outside an organizational network, to be subjected to identity authentication, authorization, and continuous verification based on a security configuration before being granted or maintaining access to applications and data. One of the characteristics of the zero-trust model is that its identity authentication of users and devices is a continuous process, rather than a one-time authentication. In this way, the zero-trust model may ensure that only authenticated and authorized users and devices can access sensitive data and applications, and can minimize the risk of unauthorized access and data leakage.

SUMMARY

In a first aspect of the present disclosure, a method for identity authentication is provided. The method includes searching, in response to receiving an identity authentication request from a user at an edge server, an identity authentication database of the edge server for identity authentication information associated with the user. The method further includes sending, in response to the identity authentication information associated with the user not being found in the identity authentication database, the identity authentication request to a cloud server, the cloud server including an agent for interfacing with a plurality of identity authentication providers. In addition, the method further includes receiving the identity authentication information associated with the user from the cloud server, storing the identity authentication information to the identity authentication database, and using the identity authentication information to authenticate the user.

In a second aspect of the present disclosure, an edge server is provided. The edge server includes at least one processor; and a memory coupled to the at least one processor and having instructions stored thereon, wherein the instructions, when executed by the at least one processor, cause the edge server to perform actions comprising: in response to receiving an identity authentication request from a user, searching an identity authentication database of the edge server for identity authentication information associated with the user; in response to the identity authentication information associated with the user not being found in the identity authentication database, sending the identity authentication request to a cloud server, the cloud server comprising an agent for interfacing with a plurality of identity authentication providers; receiving the identity authentication information associated with the user from the cloud server; storing the identity authentication information to the identity authentication database; and using the identity authentication information to authenticate the user.

In a third aspect of the present disclosure, a computer program product is provided. The computer program product is tangibly stored on a non-transitory computer-readable medium and comprises machine-executable instructions, wherein the machine-executable instructions, when executed by a machine, cause the machine to perform actions comprising: in response to receiving an identity authentication request from a user at an edge server, searching an identity authentication database of the edge server for identity authentication information associated with the user; in response to the identity authentication information associated with the user not being found in the identity authentication database, sending the identity authentication request to a cloud server, the cloud server comprising an agent for interfacing with a plurality of identity authentication providers; receiving the identity authentication information associated with the user from the cloud server; storing the identity authentication information to the identity authentication database; and using the identity authentication information to authenticate the user.

It should be understood that the content described in this Summary is neither intended to limit key or essential features of embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which.

DETAILED DESCRIPTION

Figure 1:
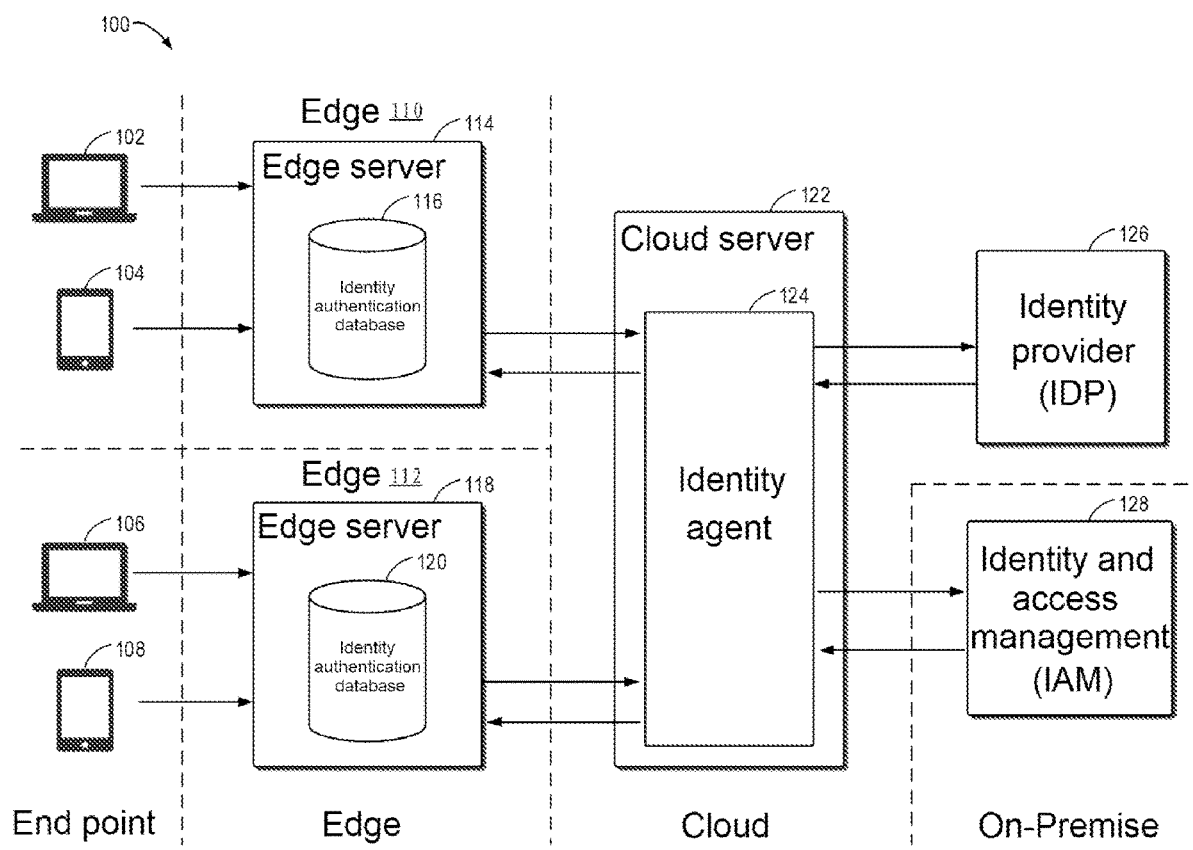
FIG. 1 is a schematic diagram of an example environment in which a plurality of embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

When managing identities of users, a zero-trust model ensures that only authenticated and authorized users and devices can access sensitive data and applications through continuous authentication for users and devices. In the zero-trust model, IAM illustratively provides a uniform access point through which various service providers can query the IAM for information about a user, and authenticate and authorize the user. In the real world, the implementation and deployment of a zero-trust model is very complicated. For example, in a large enterprise environment, different branches of the enterprise may have different IAMs, and some of these IAMs may be deployed in a cloud and others may be deployed in the enterprise environment (e.g., on-premise). Deploying policy decision points and policy execution points in a cloud will help handle access requests and collection of data from the Internet and one or more intranets. All endpoints can access a security model in the cloud through different edge devices. For example, a cell phone can access the security model through a base station, or an industrial device can access the security model through a gateway. These endpoints will be authenticated by communicating directly with IAMs or by redirecting to the IAMs through services. The services will then obtain access information from the policy decision points. This structure ensures that all users can be authenticated and obtain corresponding access permissions in a zero-trust environment based on edge and cloud. However, this structure may lead to problems such as complex IAM integration, high IAM workload, and high client latency.

IAMs have a wide variety of interfaces. These interfaces may support different protocols, for example, LDAP, OAuth2, and SAML. Even when using the same protocol, these interfaces have different implementations. For example, in SAML, accounts in XML files designed by different development teams have different attributes. As a result, there is no uniform interface that can process XML data from all IAMs. Significant complexity will be introduced when services and policy decision points are integrated with these IAMs. In addition, continuous authentication is an important part of the zero-trust architecture, and some centralized IAMs will face the problem of hardware resource shortage when performing continuous authentication. In an authentication process, IAMs need to encrypt and decrypt the ciphertext multiple times and exchange the resulting outputs with users or devices multiple times. This process consumes a lot of computing resources and network resources. In a zero-trust environment, most online accounts will perform this process regularly, which brings IAMs a heavy load, and IAMs may thus become a bottleneck when granting users access to resources. In addition, it is difficult for users to have seamless experience in a structure where a small number of centralized IAMs provide authentication services for a large number of accounts on a large scale. Continuous authentication for many users is difficult to respond to endpoints timely due to insufficient hardware computing and network resources to run IAMs. In such cases, users will encounter unpleasant experiences such as high latency when accessing websites or searching for some data.

To this end, embodiments of the present disclosure provide a solution for authenticating a user in a large-scale zero-trust environment. In embodiments of the present disclosure, a centralized identity agent deployed in a cloud is utilized to connect various IAMs and identity providers (IDPs) in a network. The identity agent can provide a uniform interface for policy engines, service providers, and the user. In addition to this, in embodiments of the present disclosure, the edge server at each edge communicates with the identity agent so that identity authentication information for the user is transmitted from the identity agent to the edge server and stored at the edge server. The identity authentication information stored in the edge server is used to authenticate the user in a subsequent continuous authentication process.

In this way, in the solution provided in embodiments of the present disclosure, the identity agent provides a uniform identity authentication interface, thereby simplifying implementations of the service providers and operations of an information technology administrator. In the solution provided by embodiments of the present disclosure, the edge servers can also be used to reduce the number of identity authentication requests that the IAMs need to handle in a continuous authentication process and reduce the load on the IAMs, so that client latency can be reduced and user experience can be improved. Moreover, the occurrence of the IAMs being blocked caused by too many identity authentication requests can also be reduced.

FIG. 1 is a schematic diagram of an example environment 100 in which a plurality of embodiments of the present disclosure can be implemented. As shown in FIG. 1, the environment 100 includes user devices 102, 104, 106, and 108 located at endpoints. The environment 100 further includes an edge server 114 located at an edge 110 and an edge server 118 located at an edge 112. The edge servers 114 and 118 may be, for example, servers, routers, switches, hubs, bridges, network access devices, wireless access points, firewalls, and other network devices. In the environment 100, the user devices 102 and 104 are closer to the edge 110, and the user devices 106 and 108 are closer to the edge 112. Each edge server has an identity authentication database for storing identity authentication information associated with a user. For example, the edge server 114 has an identity authentication database 116, and the edge server 118 has an identity authentication database 120. The environment 100 further includes a cloud server 122 and an IDP 126 located in a cloud, and the cloud server 122 has an identity agent 124. The environment 100 further includes an on-premise IAM 128. It should be understood that only one IDP and one IAM are shown in FIG. 1 for clarity, but any number of IDPs and IAMs may be provided in embodiments of the present disclosure. Similarly, any number of user devices and edge servers may be provided in embodiments of the present disclosure.

In the example shown in FIG. 1, the edge server 114 may receive identity authentication requests from the user devices 102 and 104 that are closer to the edge 110, and the edge server 118 may receive identity authentication requests from the user devices 106 and 108 that are closer to the edge 112. As shown in FIG. 1, when the edge server 114 receives an identity authentication request from the user device 102, it may search the identity authentication database 116 for identity authentication information associated with a user of the user device 102. In the example shown in FIG. 1, the identity authentication information associated with the user of the user device 102 can be found in the identity authentication database 116, and the edge server 114 can then use the identity authentication information to authenticate and authorize the user of the user device 102, without communicating with the identity agent 124 and the IDP 126 in the cloud and the on-premise IAM 128.

As shown in FIG. 1, when the edge server 114 receives an identity authentication request from the user device 104, it may search the identity authentication database 116 for identity authentication information associated with a user of the user device 104. In the example shown in FIG. 1, the identity authentication information associated with the user of the user device 104 is not found in the identity authentication database 116, and then the edge server 114 sends a request to the identity agent 124 to authenticate the user of the user device 104. The identity agent 124 communicates with the IDP 126 or the on-premise IAM 128 to obtain the identity authentication information for the user. The identity agent 124 then transmits the identity authentication information to the edge server 114, such that the edge server 114 can authenticate and authorize the user of the user device 104 through the identity authentication information. In addition, this identity authentication information may also be stored in the identity authentication database 116, so that the edge server 114 can directly perform identity authentication using the identity authentication information stored in the identity authentication database in the subsequent continuous authentication process, without communicating with the identity agent in the cloud.

Figure 2:
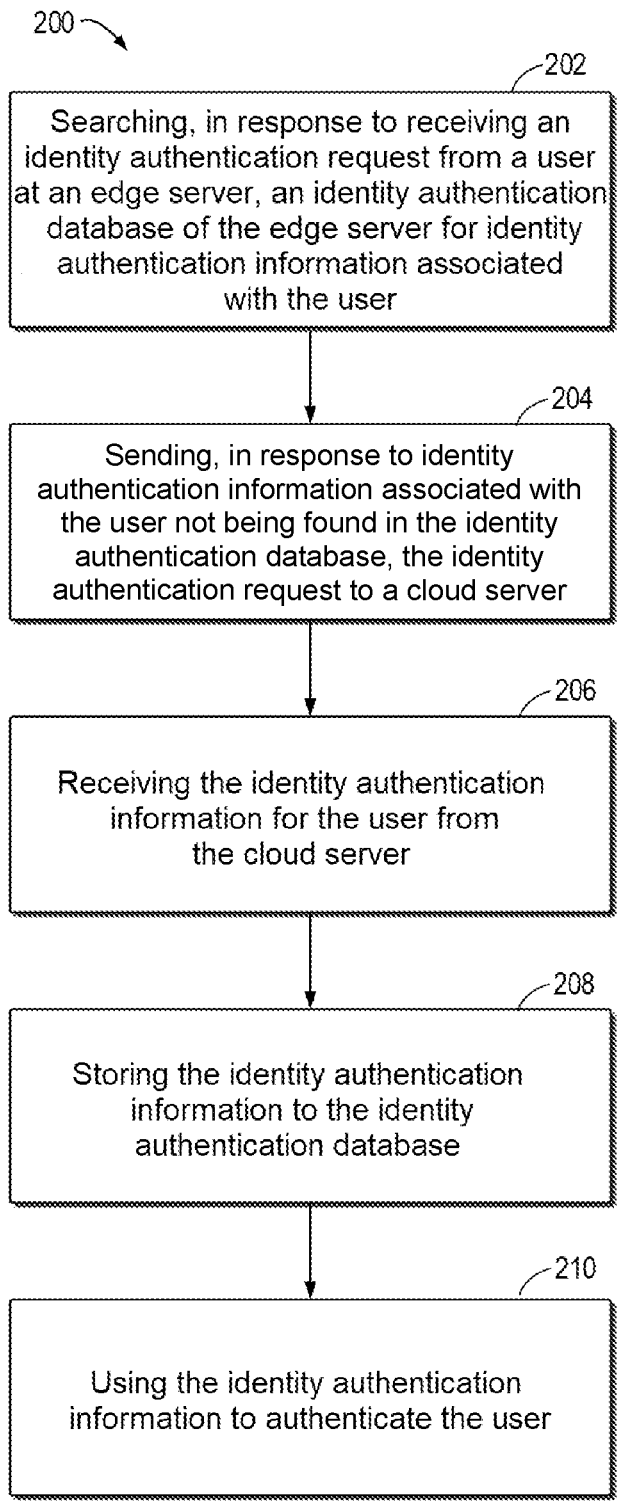
FIG. 2 is a flow chart of a method for identity authentication according to some embodiments of the present disclosure.

FIG. 2 is a flow chart of a method 200 for identity authentication according to some embodiments of the present disclosure. As shown in FIG. 2, at block 202, the method 200 includes searching, in response to receiving an identity authentication request from a user at an edge server, an identity authentication database of the edge server for identity authentication information associated with the user. For example, in the environment 100 shown in FIG. 1, the edge server 114 located at the edge 110 receives an identity authentication request from a user of the user device 104 close to the edge 110, and the edge server 114 searches the identity authentication database 116 for the identity authentication information associated with the user.

At block 204, the method 200 includes sending, in response to identity authentication information associated with the user not being found in the identity authentication database, the identity authentication request to a cloud server, the cloud server including an agent for interfacing with a plurality of identity authentication providers. For example, in the environment 100 shown in FIG. 1, the edge server 114 does not find the identity authentication information associated with the user of the user device 104 in the identity authentication database 116, and then the edge server 114 sends the identity authentication request to the identity agent 124 located at the cloud server 122 to authenticate the user. In this process, the identity agent 124 is configured to interface with various IDPs and IAMs and provide a uniform identity authentication interface, instead of the edge server 114 communicating directly with the various IDPs or IAMs to request identity authentication for the user.

At block 206, the method 200 includes receiving the identity authentication information for the user from the cloud server. For example, in the environment 100 shown in FIG. 1, the identity agent 124 obtains the identity authentication information for the user of the user device 104 from the IDP 126 or the on-premise IAM 128, the identity authentication information including a minimum set of information needed for authenticating the user. For example, the identity authentication information may include only user attributes (e.g., certificate or key for encryption) and login status (e.g., login session information), and does not include user personal information. The edge server 114 can then receive the identity authentication information for the user of the user device 104 from the identity agent 124 on the cloud server 122.

At block 208, the method 200 includes storing the identity authentication information for the user to the identity authentication database. For example, in the environment 100 shown in FIG. 1, after the edge server 114 receives the identity authentication information for the user of the user device 104 from the identity agent 124, the identity authentication information may be stored in the identity authentication database 116 of the edge server 114. Then, at block 210, the method 200 includes using the identity authentication information to authenticate the user. For example, the edge server 114 can use the stored identity authentication information to authenticate and authorize the user of the user device 104.

In this way, a uniform authentication interface is provided by the identity agent 124, which can simplify the implementation of the edge servers as well as other service providers. In a zero-trust environment, the identity authentication information associated with the user stored in the identity authentication database 116 on the edge server 114 can be used to authenticate the user in the subsequent continuous authentication process for the user of the user device 104, without repeatedly communicating with the cloud server 122 in the cloud, and the cloud server 122 does not need to repeatedly communicate with the IDP 126 or the on-premise IAM 128. Therefore, the large number of authentication requests that would otherwise be processed at the on-premise IAM 128 or at the identity agent 124 can be spread across the various edge servers, thereby reducing the load on the on-premise IAM 128 and the identity agent 124 and improving the performance of the overall authentication process. In addition to this, since the edge server 114 is located at the edge 110 which is closer to the user device 104, the distance between the user device 104 and a server processing the identity authentication request is reduced, thereby accelerating the response, reducing latency of the authentication process, and improving user experience.

In some embodiments, the identity agent located on the cloud server connects the various separated IAMs and IDPs in the network and provides a uniform interface to the policy engine and various objects with authentication needs. Objects with authentication needs may be, for example, service providers, users, or edge servers.

Figure 3:
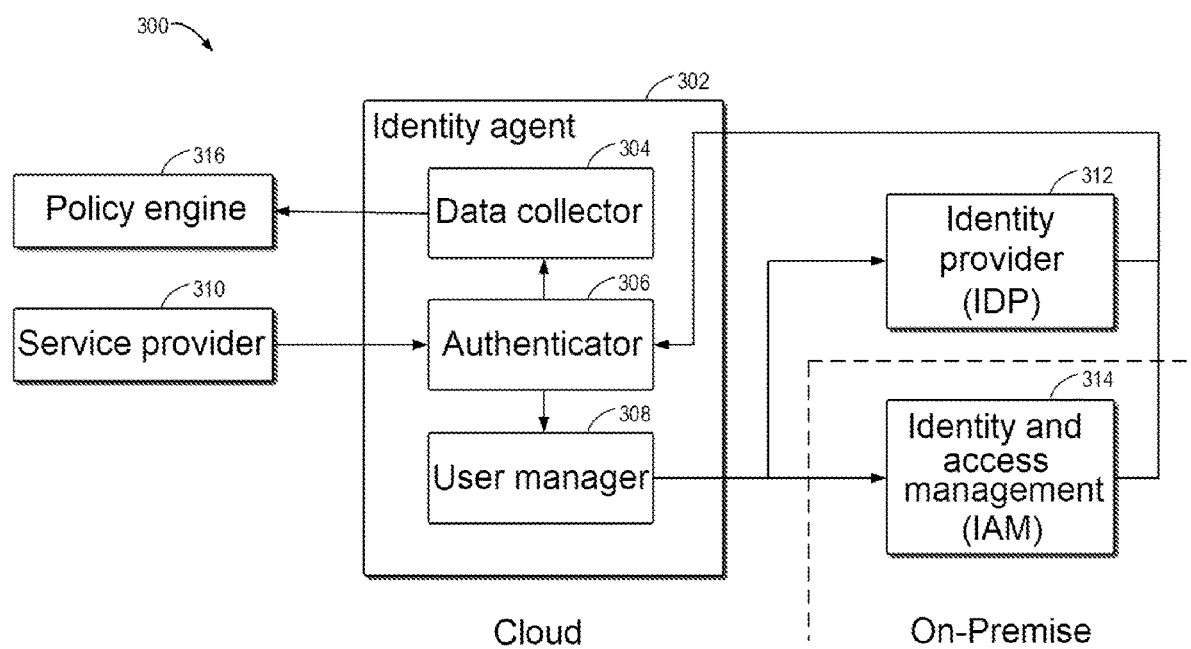
FIG. 3 is a schematic diagram of a process of using an identity agent for identity authentication according to some embodiments of the present disclosure.

FIG. 3 is a schematic diagram of a process 300 of using an identity agent for identity authentication according to some embodiments of the present disclosure. As shown in FIG. 3, the process 300 involves an identity agent 302 located in a cloud, a service provider 310, a policy engine 316, an IDP 312, and an on-premise IAM 314. The identity agent 302 includes a data collector 304, an authenticator 306, and a user manager 308. It should be understood that, although not shown in FIG. 3, the identity agent 302 may further include modules that provide necessary functions such as receiving an inbound request. In the process 300, the authenticator 306 of the identity agent 302 receives an identity authentication request from the service provider 310. In the process 300, the user manager 308 is then used to query the on-premise IAM 314 or the IDP 312 at the back end to authenticate a user. It should be understood that only one IDP and one IAM are shown in FIG. 3 for clarity, but in embodiments of the present disclosure, there may be a plurality of IDPs or IAMs. In a real large-scale zero-trust environment, there are usually a plurality of different IDPs and IAMs. In this way, various protocol implementations and network connections associated with the cloud or local IAM are centralized at the identity agent 302 for handling. The identity agent 302 handles the part of an integration process that has a high complexity, thus providing a simpler implementation for other objects such as service providers and providing a simpler operation for an account administrator.

In addition to this, as shown in FIG. 3, the identity agent 302 may utilize the data collector 304 to collect user information needed by the policy engine 316. The data collector 304 can handle a variety of services from a user and the service provider 310, so the data collector 304 can record statistical information and status for use in dynamic policy algorithms in a centralized manner. These statistical information and status may be, for example, the frequency of identity authentication requests or load patterns for a particular user or resource, and these statistical information and status are key data for generating a dynamic policy strategy in the zero-trust principle.

In the above embodiment of using the identity agent 302 for identity authentication, the identity agent 302 is configured to interface with a variety of different IAMs and IDPs, thus providing a simple implementation for the service provider 310. However, a centralized identity agent would have a difficulty in responding in time to a large number of requests from various services around a large network. For example, in a network that includes both edges and a cloud, services at each edge may require the identity agent 302 to learn attributes of users at various endpoints. In a zero-trust environment, the identity agent 302 is illustratively configured to continuously perform this process to ensure the authenticity of accounts. As a result, computational resources of the identity agent 302 are exhausted by a large number of encryption and decryption operations in the identity authentication process, and a large amount of network bandwidth is occupied during data transmission, which will increase latency in response to identity authentication requests and bring users bad user experience.

To reduce the load on the identity agent, in some embodiments, a distributed edge server at each edge and communicating with the identity agent may be utilized to address this issue. In some embodiments, after an identity authentication request from a user is received at an edge server, an identity authentication database of the edge server may be searched for identity authentication information associated with the user. If the identity authentication information is not found in the identity authentication database, the identity authentication request is sent to the identity agent. After the identity authentication information for the user is received from the identity agent, the identity authentication information may be stored in the identity authentication database and used to authenticate the user.

In some embodiments, when the identity authentication request for the user is received again at that edge server, the identity authentication information previously stored in its identity authentication database may be used at this edge server to authenticate the user. In some embodiments, user behaviors can be collected by this edge server and sent to the identity agent on a cloud server, and then an authentication policy change for the user can be received from the identity agent.

Figure 4:
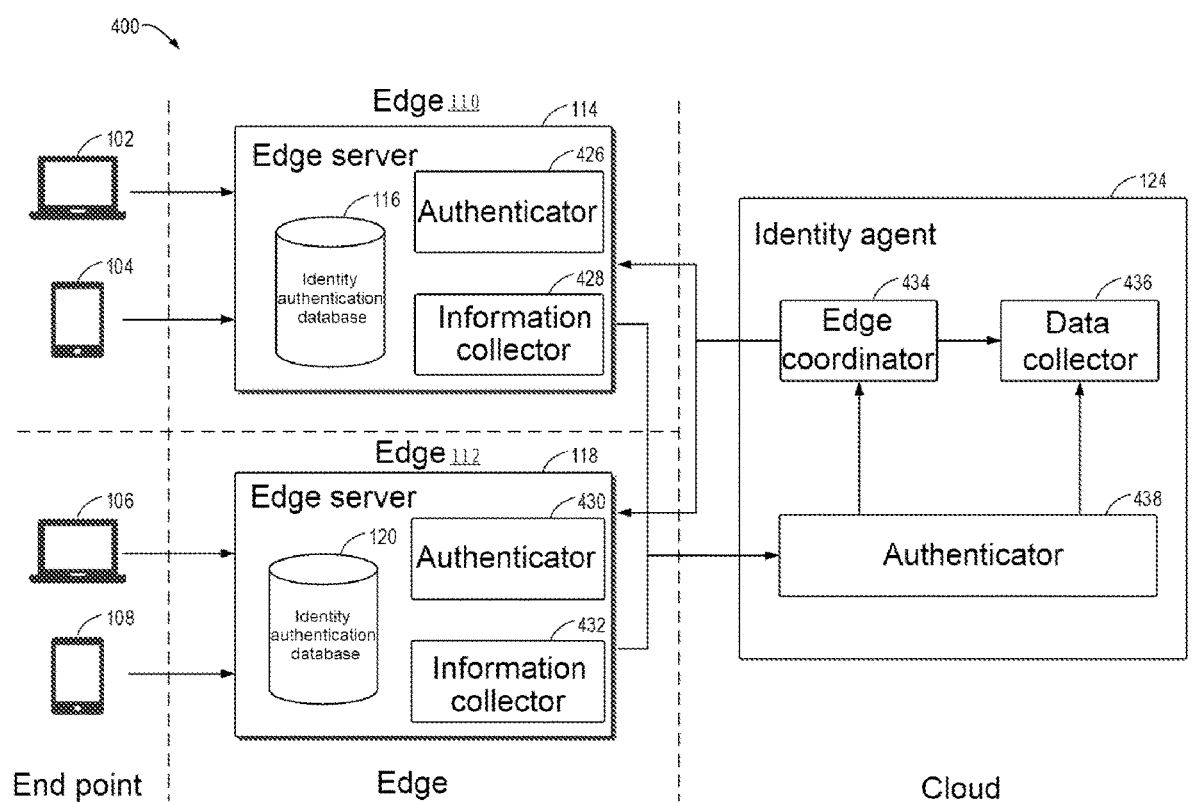
FIG. 4 is a schematic diagram of a process for authenticating a user using edge servers and an identity agent according to some embodiments of the present disclosure.

FIG. 4 is a schematic diagram of a process 400 for authenticating a user using edge servers and an identity agent according to some embodiments of the present disclosure. As shown in FIG. 4, there is an edge server 114 and an edge server 118 at each edge. The edge server 114 includes an authenticator 426 and an information collector 428. The edge server 118 includes an authenticator 430 and an information collector 432. The identity agent 124 includes an edge coordinator 434, a data collector 436, and an authenticator 438. The identity authentication databases 116 and 120 are used to store identity authentication information associated with a user, and the identity authentication information may include user attributes and login status. The authenticators 426 and 430 are configured to authenticate users. For example, the authenticator 426 may be configured to authenticate users of user devices 102 and 104, and the authenticator 430 may be configured to authenticate users of user devices 106 and 108. The information collectors 428 and 432 are responsible for recording user behaviors and for sending the recorded user behaviors to the data collector 436 of the identity agent 124.

In the process 400, when a user device (e.g., the user device 102) first logs in, the edge server 114 receives an identity authentication request from the user device 102. The edge server 114 may then search the identity authentication database 116 for the presence of identity authentication information associated with the user of the user device 102. When the user logs in for the first time, there is no identity authentication information associated with the user in the identity authentication database 116 yet. The edge server 114 then sends the identity authentication request to the identity agent 124 located at the cloud server. After receiving this identity authentication request, the identity agent 124 obtains, using the authenticator 438, identity authentication information for the user by communicating with back-end identity authentication providers (e.g., the IDP 126 and the on-premise IAM 128 in FIG. 1). The edge coordinator 434 of the identity agent 124 may then transmit the identity authentication information for the user to the edge server 114, and the edge server then stores the authentication information in the identity authentication database 116. In some embodiments, the identity authentication information transmitted to the edge server 114 may include only the necessary user attributes and login status for authenticating the user. In some embodiments, the user attributes may include only authentication credentials for authenticating the user and a key for encryption, and the login status may be the login session information. In these embodiments, data such as user personal information that is not related to identity authentication will not be transmitted to the edge server 114, allowing for enhanced protection of user privacy on the one hand, and reducing the size of data transmitted between the cloud and the edge, reducing latency, and saving network resources on the other hand.

In the process 400, after the edge server 114 completes the authentication for the user of the user device 102, the edge server 114 can use the identity authentication information associated with the user previously stored in the identity authentication database 116 to authenticate the user in the subsequent continuous authentication process for the user. Therefore, all subsequent authentication processes will occur only between the user device 102 and the edge server 114, without further communication with the identity agent 124 in the cloud. In this way, the process 400 can fully utilize the hardware resources of the edge servers at each edge to authenticate nearby user devices, thereby reducing the load on the identity agent 124, reducing latency for endpoint users, and improving user experience. In addition, because the edge server 114 is closer to the user device 102, communications between the user device 102 and the identity agent 124 in the cloud or authentication providers that are further away can be reduced, thus further reducing latency and improving user experience.

In addition to this, the process 400 uses the information collector 428 of the edge server 114 to record user behaviors and send the user behaviors back to the identity agent 124. The data collector 436 of the identity agent 124 collects these user behaviors through the edge coordinator 434, and can analyze these user behaviors and send corresponding instructions to the edge server 114 when the authentication policy for the user changes. Such change in policy may be, for example, a change in the method for identity authentication, a change in the authentication frequency in the continuous authentication process, or the like. In this way, it is possible to ensure timely updates of the authentication policy for the user by the edge server 114, so that accuracy of the identity authentication process can be ensured.

In some cases, the user device may be a mobile device, and a user holding such a mobile device may leave the range of the current edge and enter the range of another edge. In this case, the identity authentication information for the user can be transferred for subsequent authentication. In some embodiments, when the user device moves from a source edge to a destination edge, a source edge server located at the source edge may be informed of or predict a destination edge server located at the destination edge to which the user will connect. Therefore, when the source edge server determines that the user device will connect to the destination edge server, identity authentication information stored in the source edge server associated with the user may be transmitted to the destination edge server for the subsequent authentication for the user. In some embodiments, the source edge server may send a notification to the identity agent that identity authentication information for the user has been transmitted to the destination edge server. In some embodiments, the source edge server may delete the identity authentication information for the user stored on it.

Figure 5A:
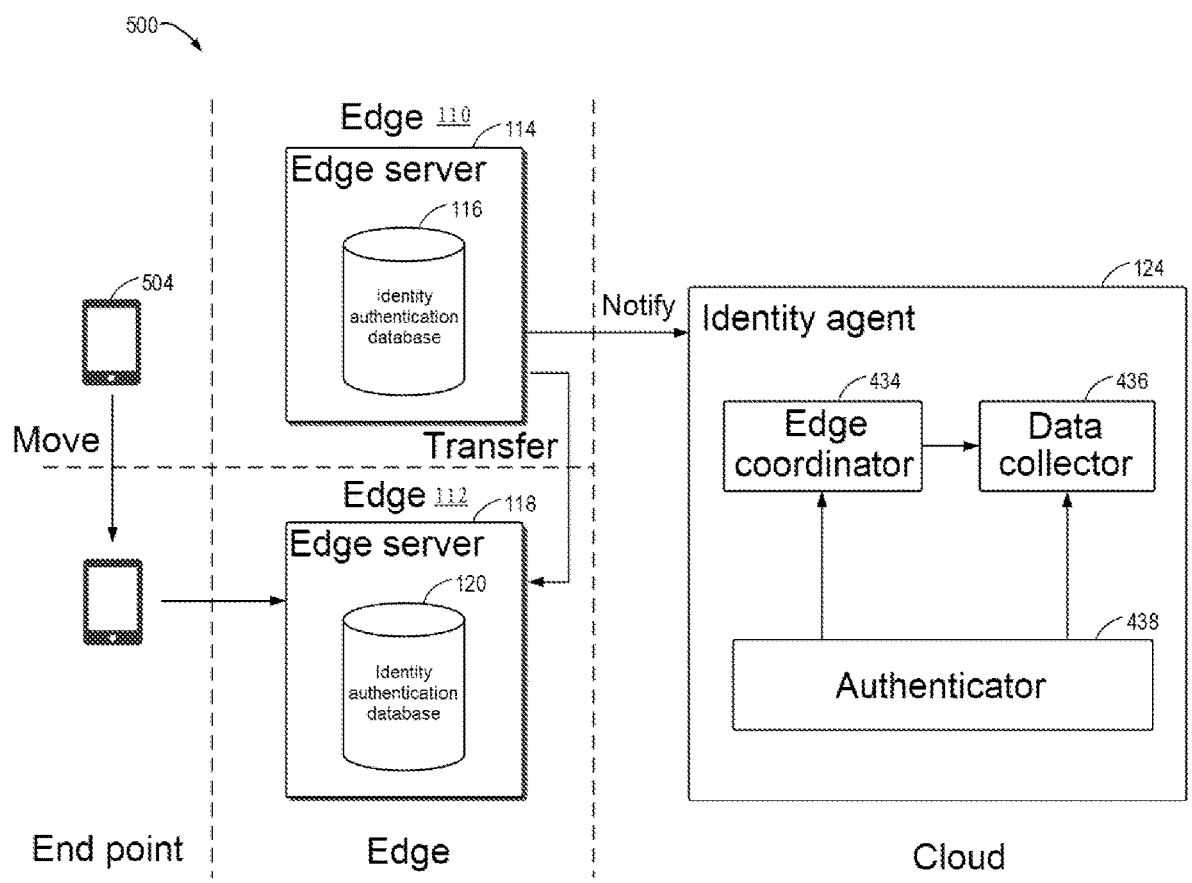
FIG. 5A is a schematic diagram of a process for authenticating a user in a case where a source edge server is allowed to be informed of a destination edge server when a user device moves to a destination edge according to some embodiments of the present disclosure.

FIG. 5A is a schematic diagram of a process 500 for authenticating a user in a case where a source edge server is allowed to be informed of a destination edge server when a user device moves to a destination edge according to some embodiments of the present disclosure. In the example shown in FIG. 5A, a user device 504 is located at an edge 110 and is authenticated by the communication with an edge server 114. The edge server 114 has previously obtained identity authentication information for a user of the user device 504 from an identity agent 124 and stored the identity authentication information in an identity authentication database 116. When the edge server 114 is informed of or predicts by various means or techniques that the user device 504 will move to an edge 112 and connect to an edge server 118, the edge server 114 may transfer the user attributes and session login information for the user to the edge server 118 (e.g., over a secure channel such as SSL/TLS). The data will be stored in an identity authentication database 120. The edge server 114 may then notify the identity agent 124 that the identity authentication information for the user has been transferred to the edge server 118, allowing an edge coordinator 434 of the identity agent 124 to keep track of the latest location of the identity authentication information for the user. The edge server 114 can then delete the identity authentication information for the user stored in the identity authentication database 116, thereby protecting user privacy. After the user device 504 moves to the edge 112, the edge server 118 receives an identity authentication request from the user device 504. The edge server 118 can then use the transferred identity authentication information to authenticate the user of the user device 504 without further communicating with the identity agent 124 or a back-end identity authentication provider.

Figure 5B:
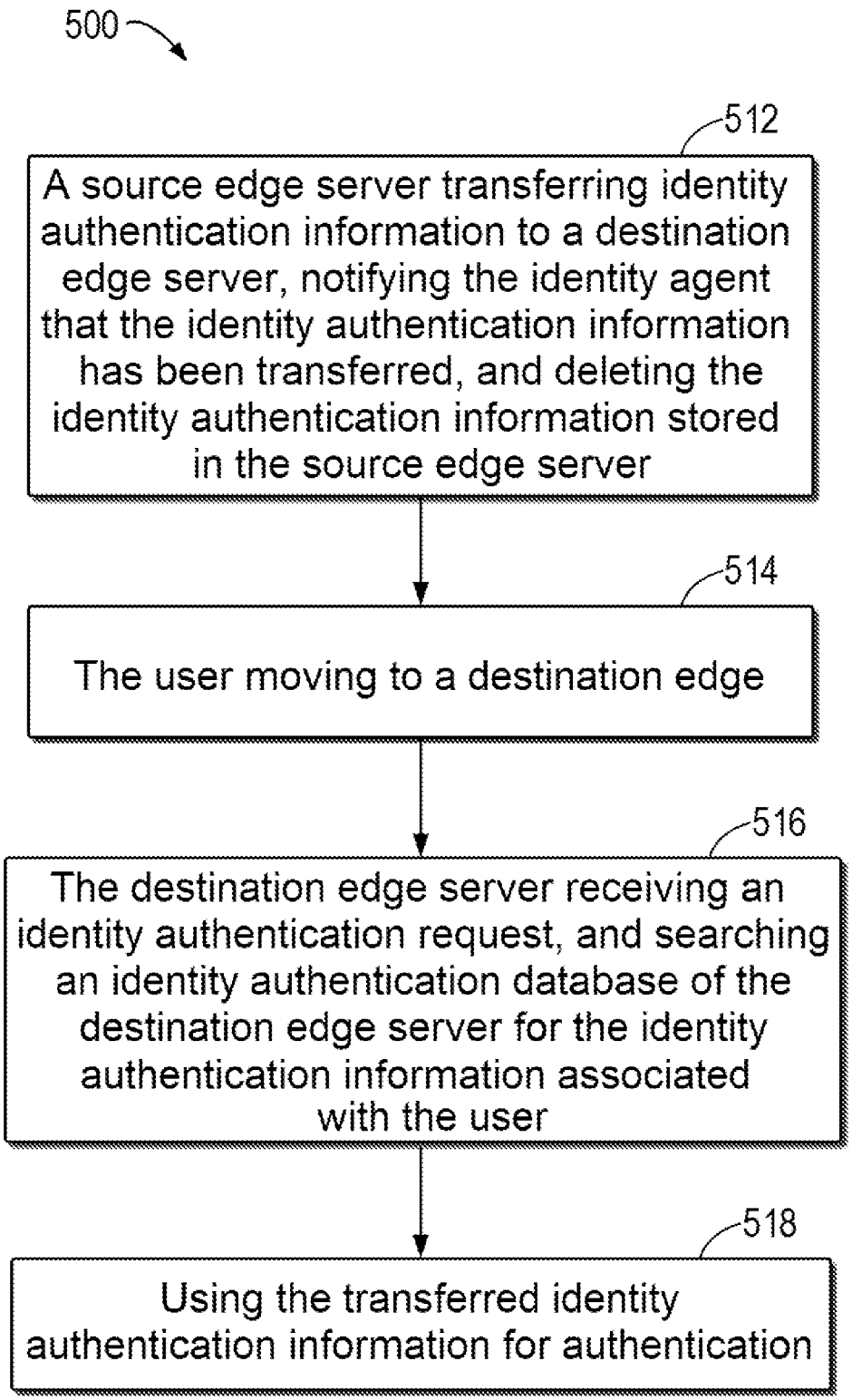
FIG. 5B is a flow chart of the process for authenticating a user in a case where a source edge server is allowed to be informed of a destination edge server when a user device moves to a destination edge according to some embodiments of the present disclosure.

FIG. 5B is a flow chart of the process 500 for authenticating a user in a case where a source edge server is allowed to be informed of a destination edge server when a user device moves to a destination edge according to some embodiments of the present disclosure. As shown in FIG. 5B, when a source edge server is allowed to be informed of or predict that a user device will connect to a destination edge server, at block 512, the source edge server transfers identity authentication information for the user to the destination edge server, and then notifies the identity agent that the identity authentication information for the user has been transferred to the destination edge server and deletes the identity authentication information stored in an identity authentication database of the source edge server. For example, in the example of FIG. 5A, the edge server 114 may be informed of or predict that the user device 504 moves from the edge 110 to the edge 112, and the edge server 114 may transfer the identity authentication information for the user to the edge server 118 and store it in the identity authentication database 120. The edge server 114 then notifies the identity agent 124 that the identity authentication information for the user has been transferred to the edge server 118 and deletes that data from the identity authentication database 116.

At block 514, the user moves to a destination edge. At block 516, the destination edge server receives an identity authentication request for the user and searches an identity authentication database of the destination edge server for the identity authentication information associated with the user.

At block 518, the destination edge server uses the previously transferred identity authentication information for the user to authenticate the user. For example, in the example of FIG. 5A, after the user device 504 moves from the edge 110 to the edge 112, the edge server 118 receives the identity authentication request for the user. The edge server 118 then searches the identity authentication database 120 for the identity authentication information associated with the user. Since the identity authentication information for the user has previously been transferred from the edge server 114 to the edge server 118, the edge server 118 can directly use the identity authentication information to authenticate the user without communicating with the identity agent 124 or a back-end identity authentication provider.

In this way, the identity authentication information for the user can be transferred between edge servers without sending the identity authentication request to the identity agent 124 or the back-end identity authentication provider, thereby reducing the number of identity authentication requests to be processed at the identity agent 124 or the identity authentication provider, and improving the performance of the overall network. In addition, the identity agent 124 is informed of the location information of the user device 504 in a timely manner, which is conducive to the subsequent identity authentication for the user. In addition, user privacy can be protected by deleting the identity authentication information for the user from the source edge server timely.

In some embodiments, when a user device moves from a source edge to a destination edge, a source edge server located at the source edge cannot be informed that the user will connect to a destination edge server. Therefore, in the event that the source edge server loses a connection to the user device, the source edge server may send a notification of losing user connection to the identity agent. The destination edge server may send the identity authentication request to the identity agent when the destination edge server receives the identity authentication request for the user. The identity agent may transmit the identity authentication information for the user to the destination edge server. In some embodiments, the identity agent may send an instruction to the source edge server to delete the identity authentication information associated with the user, and the source edge server may then delete the identity authentication information associated with the user from the identity authentication database.

Figure 6A:
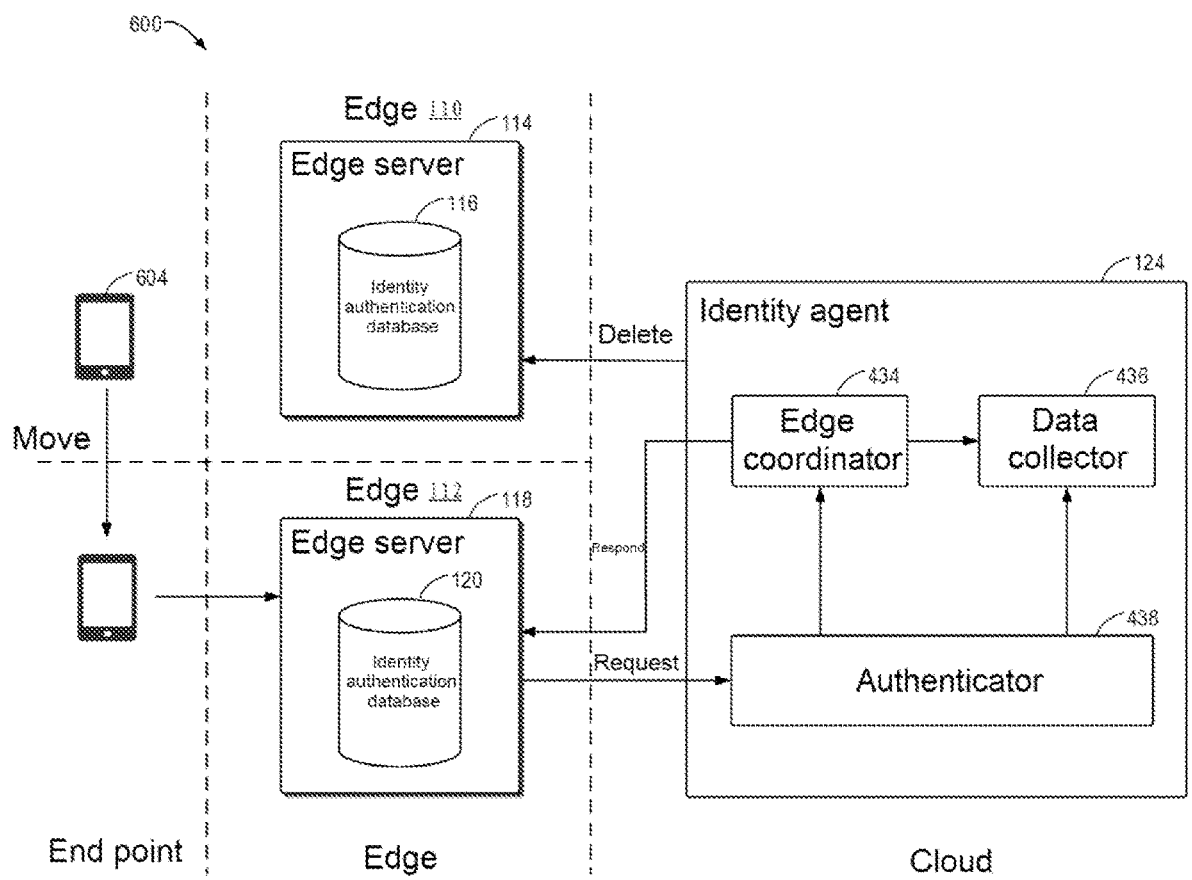
FIG. 6A is a schematic diagram of a process for authenticating a user in a case where a source edge server is not allowed to be informed of a destination edge server when a user device moves to a destination edge according to some embodiments of the present disclosure.

FIG. 6A is a schematic diagram of a process 600 for authenticating a user in a case where a source edge server is not allowed to be informed of a destination edge server when a user device moves to a destination edge according to some embodiments of the present disclosure. In the example shown in FIG. 6A, a user device 604 is located at an edge 110 and is authenticated by the communication with an edge server 114. The edge server 114 has previously obtained identity authentication information for a user of the user device 604 from an identity agent 124 and stored the identity authentication information in an identity authentication database 116. When the edge server 114 is not allowed to be informed in advance that the user device 604 will move to an edge 112 and connect to an edge server 118, the edge server 114 will lose a connection to the user device 604 after the user device 604 moves to the edge 112. When the edge server 118 receives an identity authentication request from the user device 604, the edge server 118 may send the identity authentication request to the identity agent 124 because the identity authentication information associated with the user is not stored in the identity authentication database. In response to the identity authentication request, the identity agent 124 may transmit the identity authentication information for the user to the edge server 118 and store it in an identity authentication database 120, allowing the edge server 118 to use the identity authentication information for continuous authentication of the user device 604. In some embodiments, the edge server 114 may notify the identity agent 124 that it has lost the connection with the user device 604 after losing the connection to the user device 604. Then, when informed that the user device 604 is connected to the edge server 118, the identity agent 124 instructs the edge server 114 to delete the identity authentication information associated with the user. After receiving this instruction, the edge server 114 may delete the identity authentication information associated with the user from the identity authentication database 116.

Figure 6B:
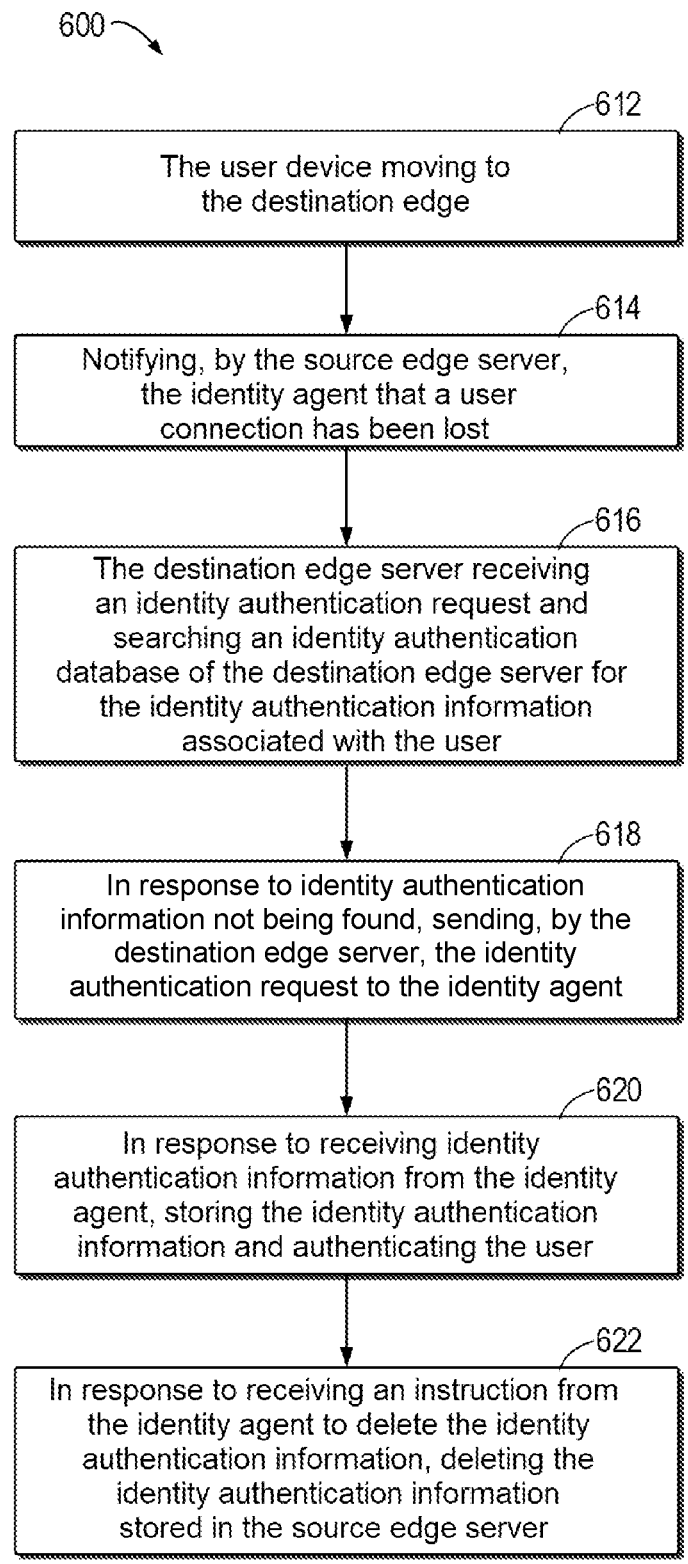
FIG. 6B is a flow chart of the process for authenticating a user in a case where a source edge server is not allowed to be informed of a destination edge server when a user device moves to a destination edge according to some embodiments of the present disclosure.

FIG. 6B is a flow chart of the process 600 for authenticating a user in a case where a source edge server is not allowed to be informed of a destination edge server when a user device moves to a destination edge according to some embodiments of the present disclosure. As shown in FIG. 6B, at block 612, the user device moves to the destination edge when the source edge server is not allowed to be informed in advance that the user device will connect to the destination edge server. For example, in the example of FIG. 6A, the user device 604 moves from the edge 110 to the edge 112. At block 614, the source edge server notifies the identity agent that a user connection has been lost. For example, the edge server 114 loses a connection to the user device 604, and then the edge server 114 notifies the identity agent 124 that the connection to the user device 604 has been lost.

At block 616, the destination edge server receives an identity authentication request and searches an identity authentication database of the destination edge server for the identity authentication information associated with the user. For example, the edge server 118 receives an identity authentication request from the user device 604 and may search the identity authentication database 120 for the identity authentication information associated with the user of the user device 604. At block 618, in response to identity authentication information associated with the user not being found in the identity authentication database, the destination edge server sends the identity authentication request to the identity agent. For example, in response to identity authentication information associated with the user of the user device 604 not being found in the identity authentication database 120 of the edge server 118, the edge server 118 may send the identity authentication request to the identity agent 124. At block 620, in response to receiving identity authentication information for the user from the identity agent, the destination edge server stores the identity authentication information in the identity authentication database and uses the identity authentication information to authenticate the user. For example, the edge server 118 receives identity authentication information for the user of the user device 604 from the identity agent 124, and may store the identity authentication information in the identity authentication database 120 and authenticate the user. At block 622, in response to receiving an instruction from the identity agent to delete the identity authentication information, the identity authentication information stored in the source edge server is deleted. For example, the edge server 114 receives an instruction from the identity agent 124 to delete the identity authentication information associated with the user of the user device 604, and then deletes the identity authentication information from the identity authentication database 116.

In this way, it is possible to reduce the load on the identity agent by reducing the number of identity authentication requests sent to the identity agent in the event that the user moves from one edge to another, thereby reducing latency for endpoint users and improving user experience. In addition, user privacy can be better protected because the identity authentication information stored in the source edge server is deleted in time.

In some embodiments, in response to receiving a logout request from a user at an edge server, login session information of the user can be deleted from the edge server, and then the user attributes can be deleted from the edge server after a predetermined period of time. For example, in the example shown in FIG. 1, the edge server 114 has identity authentication information associated with the user of the user device 102 stored in the identity authentication database 116, the identity authentication information including user attributes and login session information. When the edge server 114 receives a logout request from the user, login session information of the user can be deleted immediately, but the user attributes are retained for a predetermined period of time for the next time the user logs in at the edge 110. In this way, the amount of data that needs to be requested and transmitted the next time a user logs back in at the same edge after logging out can be reduced, thereby saving network resources, reducing latency, and improving user experience.

Figure 7:
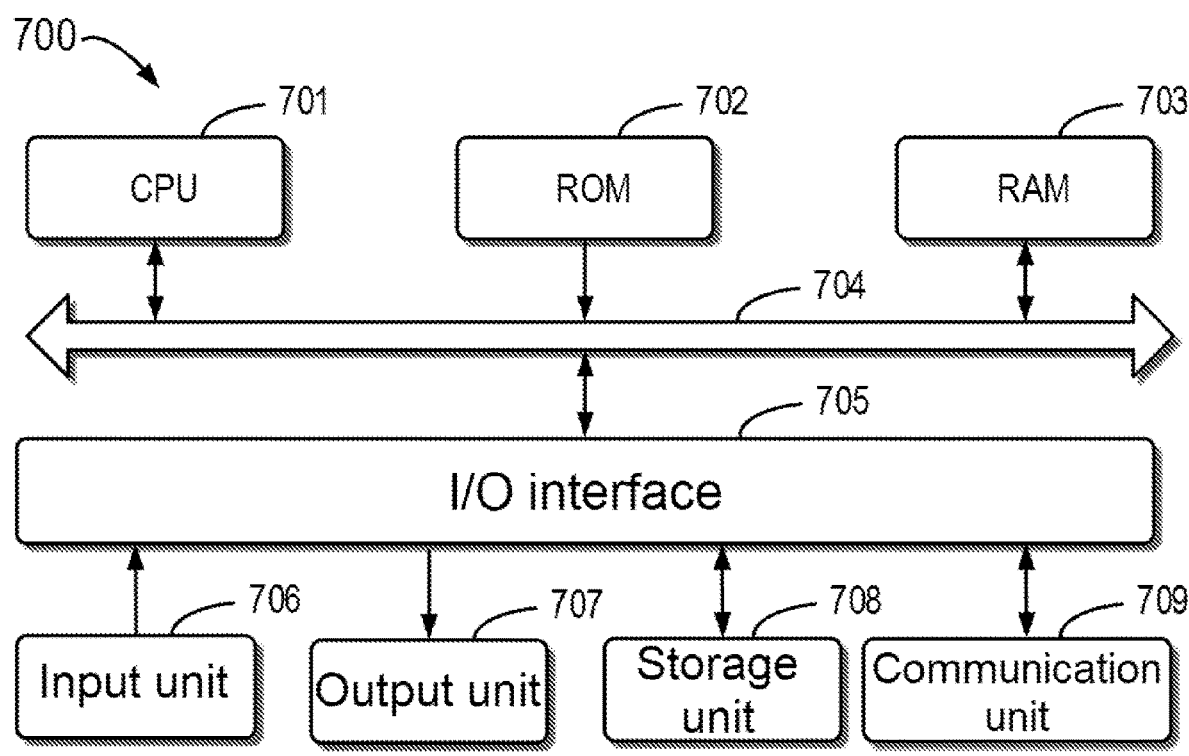
FIG. 7 is a block diagram of a device that can implement a plurality of embodiments of the present disclosure.

FIG. 7 is a block diagram of an example device 700 which can be used to implement embodiments of the present disclosure. As shown in the figure, the device 700 includes a computing unit 701, illustratively comprising a central processing unit (CPU), that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The computing unit 701, the ROM 702, and the RAM 703 are connected to each other via a bus 704. An input/output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The computing unit 701 may comprise various general-purpose and/or special-purpose processing components with processing and computing capabilities. Some examples of the computing unit 701 include, but are not limited to, in addition to or in place of the CPU as shown in the figure, a graphics processing unit (GPU), various specialized artificial intelligence (AI) computing chips, various computing units for running machine learning model algorithms, a digital signal processor (DSP), and any appropriate processor, controller, microcontroller, and the like. The computing unit 701 performs various methods and processes described above, such as the method 200. For example, in some embodiments, the method 200 may be implemented as a computer software program that is tangibly included in a machine-readable medium, such as the storage unit 708. In some embodiments, part or all of the computer program may be loaded and/or installed onto the device 700 via the ROM 702 and/or the communication unit 709. When the computer program is loaded to the RAM 703 and executed by the computing unit 701, one or more steps of the method 200 described above may be performed. Alternatively, in other embodiments, the computing unit 701 may be configured to implement the method 200 in any other suitable manner (such as by means of firmware).

The above-described functions herein may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should not be construed as an indication that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for identity authentication, comprising:
in response to receiving an identity authentication request from a user at an edge server, searching an identity authentication database of the edge server for identity authentication information associated with the user;
in response to the identity authentication information associated with the user not being found in the identity authentication database, sending the identity authentication request to a cloud server, the cloud server comprising an agent for interfacing with a plurality of identity authentication providers including at least a first identity authentication provider and a second identity authentication provider different than the first identity authentication provider, the first and second identity authentication providers being configured to provide the agent of the cloud server with respective different types of identity authentication information associated with the user, via respective first and second different interfaces with the agent of the cloud server, wherein in response to the identity authentication information associated with the user being found in the identity authentication database, the user is authenticated by the edge server using the identity authentication information found in the identity authentication database without sending the identity authentication request to the cloud server and without requiring the edge server to access any of the first and second identity authentication providers;
in response to sending the identity authentication request to the cloud server, receiving the identity authentication information associated with the user from the cloud server as obtained by the agent of the cloud server via at least one of the first and second different interfaces;
storing the received identity authentication information to the identity authentication database;
using the received identity authentication information to authenticate the user; and
in response to movement of the user from a range of one edge serviced by the edge server to a range of another edge serviced by another edge server, triggering transfer of at least a portion of the identity authentication information of the identity authentication database to another identity authentication database of the other edge server, such that the user can be authenticated by the other edge server without sending an additional identity authentication request to the cloud server and without requiring the other edge server to access any of the first and second identity authentication providers.

2. The method according to claim 1, further comprising:
receiving a second identity authentication request from the user at the edge server; and
in response to receiving the second identity authentication request from the user at the edge server, authenticating the user at the edge server using the identity authentication information stored in the identity authentication database.

3. The method according to claim 1, further comprising:
collecting user behaviors by the edge server;
sending the user behaviors to the cloud server; and
receiving an authentication policy change for the user from the cloud server.

4. The method according to claim 1, wherein the edge server is a first edge server located at a first edge, the method further comprising:
in response to determining that a user device of the user will be connected to a second edge server located at a second edge, transferring identity authentication information for the user by the first edge server to the second edge server.

5. The method according to claim 4, further comprising:
sending a notification by the first edge server to the agent that the identity authentication information for the user has been transferred to the second edge server.

6. The method according to claim 5, further comprising:
deleting the identity authentication information for the user from the first edge server.

7. The method according to claim 1, wherein the edge server is a first edge server located at a first edge, the method further comprising:
in response to the first edge server losing a connection to a user device of the user, sending, by the first edge server to the agent, a notification of losing user connection,
wherein when a second edge server located at a second edge receives a second identity authentication request from the user, the agent transmits new identity authentication information for the user to the second edge server.

8. The method according to claim 7, further comprising:
receiving, at the first edge server, an instruction to delete information associated with the user; and
in response to receiving, at the first edge server, an instruction to delete information associated with the user, deleting the identity authentication information for the user.

9. The method according to claim 1, wherein the identity authentication information comprises user attribute information and login session information, the method further comprising:
receiving a logout request from the user at the edge server; and
in response to receiving the logout request,
deleting the login session information from the edge server, and
deleting the user attribute information from the edge server after a predetermined period of time.

10. The method according to claim 1, wherein at least one of the plurality of identity authentication providers comprises at least one of an identity provider (IDP) and an identity and access management (IAM) system.

11. An edge server, comprising:
at least one processor; and
memory coupled to the at least one processor and having instructions stored thereon, wherein the instructions, when executed by the at least one processor, cause the edge server to perform actions comprising:
in response to receiving an identity authentication request from a user, searching an identity authentication database of the edge server for identity authentication information associated with the user;
in response to the identity authentication information associated with the user not being found in the identity authentication database, sending the identity authentication request to a cloud server, the cloud server comprising an agent for interfacing with a plurality of identity authentication providers including at least a first identity authentication provider and a second identity authentication provider different than the first identity authentication provider, the first and second identity authentication providers being configured to provide the agent of the cloud server with respective different types of identity authentication information associated with the user, via respective first and second different interfaces with the agent of the cloud server, wherein in response to the identity authentication information associated with the user being found in the identity authentication database, the user is authenticated by the edge server using the identity authentication information found in the identity authentication database without sending the identity authentication request to the cloud server and without requiring the edge server to access any of the first and second identity authentication providers;

in response to sending the identity authentication request to the cloud server, receiving the identity authentication information associated with the user from the cloud server as obtained by the agent of the cloud server via at least one of the first and second different interfaces;

storing the received identity authentication information to the identity authentication database;

using the received identity authentication information to authenticate the user; and in response to movement of the user from a range of one edge serviced by the edge server to a range of another edge serviced by another edge server, triggering transfer of at least a portion of the identity authentication information of the identity authentication database to another identity authentication database of the other edge server, such that the user can be authenticated by the other edge server without sending an additional identity authentication request to the cloud server and without requiring the other edge server to access any of the first and second identity authentication providers.

12. The edge server according to claim 11, wherein the actions further comprise:

receiving a second identity authentication request from the user at the edge server; and in response to receiving the second identity authentication request from the user, authenticating the user at the edge server using the identity authentication information stored in the identity authentication database.

13. The edge server according to claim 11, wherein the actions further comprise:

collecting user behaviors by the edge server;

sending the user behaviors to the cloud server; and receiving an authentication policy change for the user from the cloud server.

14. The edge server according to claim 11, wherein the edge server is a first edge server located at a first edge, the actions further comprising:

in response to determining that a user device of the user will be connected to a second edge server located at a second edge, transferring identity authentication information for the user by the first edge server to the second edge server.

15. The edge server according to claim 14, wherein the actions further comprise:

sending a notification by the first edge server to the agent that the identity authentication information for the user has been transferred to the second edge server.

16. The edge server according to claim 15, wherein the actions further comprise:

deleting the identity authentication information for the user from the first edge server.

17. The edge server according to claim 11, wherein the edge server is a first edge server located at a first edge, the actions further comprising:

in response to the first edge server losing a connection to a user device of the user, sending, by the first edge server to the agent, a notification of losing user connection, wherein when a second edge server located at a second edge receives a second identity authentication request from the user, the agent transmits new identity authentication information for the user to the second edge server.

18. The edge server according to claim 17, wherein the actions further comprise:

receiving, at the first edge server, an instruction to delete information associated with the user; and in response to receiving, at the first edge server, an instruction to delete information associated with the user, deleting the identity authentication information for the user.

19. The edge server according to claim 11, wherein the identity authentication information comprises user attribute information and login session information, the actions further comprising:

receiving a logout request from the user at the edge server; and in response to receiving the logout request, deleting the login session information from the edge server, and deleting the user attribute information from the edge server after a predetermined period of time.

20. A computer program product that is tangibly stored on a non-transitory computer-readable medium and comprises machine-executable instructions, wherein the machine-executable instructions, when executed by a machine, cause the machine to perform actions comprising:

in response to receiving an identity authentication request from a user at an edge server, searching an identity authentication database of the edge server for identity authentication information associated with the user;

in response to the identity authentication information associated with the user not being found in the identity authentication database, sending the identity authentication request to a cloud server, the cloud server comprising an agent for interfacing with a plurality of identity authentication providers including at least a first identity authentication provider and a second identity authentication provider different than the first identity authentication provider, the first and second identity authentication providers being configured to provide the agent of the cloud server with respective different types of identity authentication information associated with the user, via respective first and second different interfaces with the agent of the cloud server, wherein in response to the identity authentication information associated with the user being found in the identity authentication database, the user is authenticated by the edge server using the identity authentication information found in the identity authentication database without sending the identity authentication request to the cloud server and without requiring the edge server to access any of the first and second identity authentication providers;

in response to sending the identity authentication request to the cloud server, receiving the identity authentication information associated with the user from the cloud server as obtained by the agent of the cloud server via at least one of the first and second different interfaces;

storing the received identity authentication information to the identity authentication database;

using the received identity authentication information to authenticate the user; and in response to movement of the user from a range of one edge serviced by the edge server to a range of another edge serviced by another edge server, triggering transfer of at least a portion of the identity authentication information of the identity authentication database to another identity authentication database of the other edge server, such that the user can be authenticated by the other edge server without sending an additional identity authentication request to the cloud server and without requiring the other edge server to access any of the first and second identity authentication providers.

* * * * *